United States Patent
Thess et al.

(10) Patent No.: US 7,209,910 B2
(45) Date of Patent: Apr. 24, 2007

(54) METHOD AND APPARATUS FOR DETERMINING A SET OF LARGE SEQUENCES FROM AN ELECTRONIC DATA BASE

(75) Inventors: Michael Thess, Chemnitz (DE); Andreas Ittner, Chemnitz (DE)

(73) Assignee: prudsys AG, Chemnitz (DE)

( * ) Notice: Subject to any disclaimer, the term of this patent is extended or adjusted under 35 U.S.C. 154(b) by 438 days.

(21) Appl. No.: 10/673,040

(22) Filed: Sep. 26, 2003

(65) Prior Publication Data

US 2004/0220916 A1 Nov. 4, 2004

(30) Foreign Application Priority Data

Sep. 30, 2002 (DE) ................ 102 45 859

(51) Int. Cl.
*G06F 17/30* (2006.01)
(52) U.S. Cl. .................. 707/1; 707/2; 707/6
(58) Field of Classification Search ............ None
See application file for complete search history.

(56) References Cited

U.S. PATENT DOCUMENTS

| | | | | |
|---|---|---|---|---|
| 6,006,223 | A * | 12/1999 | Agrawal et al. | 707/5 |
| 6,308,172 | B1 * | 10/2001 | Agrawal et al. | 707/5 |
| 6,996,551 | B2 * | 2/2006 | Hellerstein et al. | 706/48 |

OTHER PUBLICATIONS

Jay Ayres, Johannes Gehrke, Tomi Yiu, and Jason Flannick. Sequential Pattern Mining using A bitmap Representation. Dept. of Computer Science, Cornell University. Jul. 2002.*

Mining Sequential Patterns, AGRAWAL, Rakesh and SRIKANT, Ramakrishnan, *IBM Almaden Research Center*, 650 Harry Road, San Jose, CA 95120, 12 pages, no date.
Capri 2.0 for Clementine, Know what events will happen next by discovering sequences in your data www.spss.com/PDFs/CP2SPCZ-1201.pdf, 2 pages, no date.

* cited by examiner

*Primary Examiner*—Neveen Abel-Jalil
(74) *Attorney, Agent, or Firm*—Sutherland Asbill & Brennan LLP

(57) ABSTRACT

The instant invention relates to a method of and an apparatus for determining a set of large sequences from an electronic data base comprising a set D={d1, ..., dn} of transactions di (1≦i≦n) in a computer system with an implemented query module, each of the large sequences on the set D of transactions di having a support value greater than or equal to a given support value S, each of the transactions di of the set D being a sequence of items of a record E={e1, ..., em} of items ej (1≦j≦m). A set Lk (k>2) of large sequences is determined from the set D of transactions, the large sequences of set Lk each comprising exactly k items of record E in a respective order $R_{LK}$, and an associated support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$, being taken into account in determining set Lk.

15 Claims, 4 Drawing Sheets

METHOD AND APPARATUS FOR DETERMINING A SET OF LARGE SEQUENCES FROM AN ELECTRONIC DATA BASE

The invention relates to the art of sequential analysis in electronic data bases.

BACKGROUND OF THE INVENTION

In sequential analyses sequences of items are extracted from transactional electronic data. As more and more transactional data are acquired electronically sequential analysis becomes more important.

A practical example of a sequential analysis is the clickstream analysis for calculating typical user paths of Web site users. Further examples of sequential analyses are text analysis for extracting characteristic series of words in electronically memorized documents and the analysis of baskets of merchandise taking into account the order of products in trade to define typical product chain purchases. Moreover, sequential analyses are widely used in chemistry and genetics.

A great number of specialized methods of sequential analysis are known to date, especially in genetics. However, very few of them are universally applicable. In the simplest case, all variants of possible sequences are studied as regards their frequency. But for reasons of computer capacity that can be done only for small amounts of data. Sequential analysis algorithms based on search trees present an alternative, such as the algorithm "Capri" by Messrs. Lumio. Yet their speed, too, is insufficient for analyzing large transaction data. Methods based on the classical analysis of baskets of merchandise offer a quicker alternative and have already been used for sequential analysis of baskets of merchandise (Agrawal R., Srikant R., Mining Sequential Patterns. IBM Almaden Research Center, 650 Harry Road, San Jose).

THE INVENTION

It is an object of the invention to indicate a method of and an apparatus for determining a set of large sequences from an electronic data base by which known shortcomings are overcome and, especially, an efficient sequential analysis can be performed on large amounts of data in diverse applications.

According to one aspect of the invention, a method is provided of determining a set of large sequences from an electronic data base comprising a set D={d1, ..., dn} of transactions di ($1 \leq i \leq n$) in a computer system with an implemented query module, each of the large sequences on the set D of transactions di having a support value greater than or equal to a given support value S, each of the transactions di of the set D being a sequence of items of a record E={e1, ..., em} of items ej ($1 \leq j \leq m$) and the method comprising the following steps:

a) determining a set L1 of large sequences from the set D of transactions, the large sequences of set L1 each comprising exactly one item of the record E, and an associated support value $S_{L1}$ on the sequence D of transactions each being greater than or equal to the given support value S;

b) determining a set L2 of large sequences from the set D of transactions, the large sequences of set L2 each comprising exactly two items of the record E in a respective order $R_{L2}$, and an associated support value $S_{L2}$ on the set D of transactions each being greater than or equal to the given support value S, and nothing but sequences comprising one of the large sequences of set L1, as a partial sequence, being taken into account in determining set L2;

c) determining a set Lk (k>2) of large sequences from the set D of transactions, the large sequences of set Lk each comprising exactly k items of record E in a respective order $R_{LK}$, and an associated support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$, being taken into account in determining set Lk; and d) repeating step c) for k=k+1 and terminating the repetition of step c) when a given termination condition is fulfilled.

According to another aspect of the invention an integrated sequential analysis system is provided, comprising:

an electronic data base comprising a set D={d1, ..., dn} of transactions di ($1 \leq i \leq n$), each of the large sequences on the set D of transactions di having a support value greater than or equal to a given support value S, each of the transactions di of the set D being a sequence of items of a record E={e1, ..., em} of items ej ($1 \leq j \leq m$);

a query module comprising a query means coupled to the data base and a processing means for detecting query parameters and generating queries to the query means;

means for determining a set L1 of large sequences from the set D of transactions, the large sequences of set L1 each comprising exactly one item of the record E, and an associated support value $S_{L1}$ on the sequence D of transactions each being greater than or equal to the given support value S;

means for determining a set L2 of large sequences from the set D of transactions, the large sequences of set L2 each comprising exactly two items of the record E in a respective order $R_{L2}$, and an associated support value $S_{L2}$ on the set D of transactions each being greater than or equal to the given support value S, and nothing but sequences comprising one of the large sequences of set L1, as a partial sequence, being taken into account in determining set L2;

means for determining a set Lk (k>2) of large sequences from the set D of transactions, the large sequences of set Lk each comprising exactly k items of record E in a respective order $R_{LK}$, and an associated support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$ being taken into account in determining set Lk; and means for repeating step c) for k=k+1 and terminating the repetition of step c) when a given termination condition is fulfilled.

In contrast to the classical basket of merchandise analysis, the invention takes into account the order of items in the transactions. The invention permits automatic evaluations of extensive amounts of electronic data according to characteristic sequences to be made efficiently in terms of time and computer capacity. Sequential analysis of large amounts of data, such as contained in logfiles of heavily frequented Web servers thus becomes possible for the first time.

DRAWING

The invention will be described further, by way of example, with reference to the accompanying drawings, in which.

EXAMPLES OF EMBODIMENTS

Figure 1:
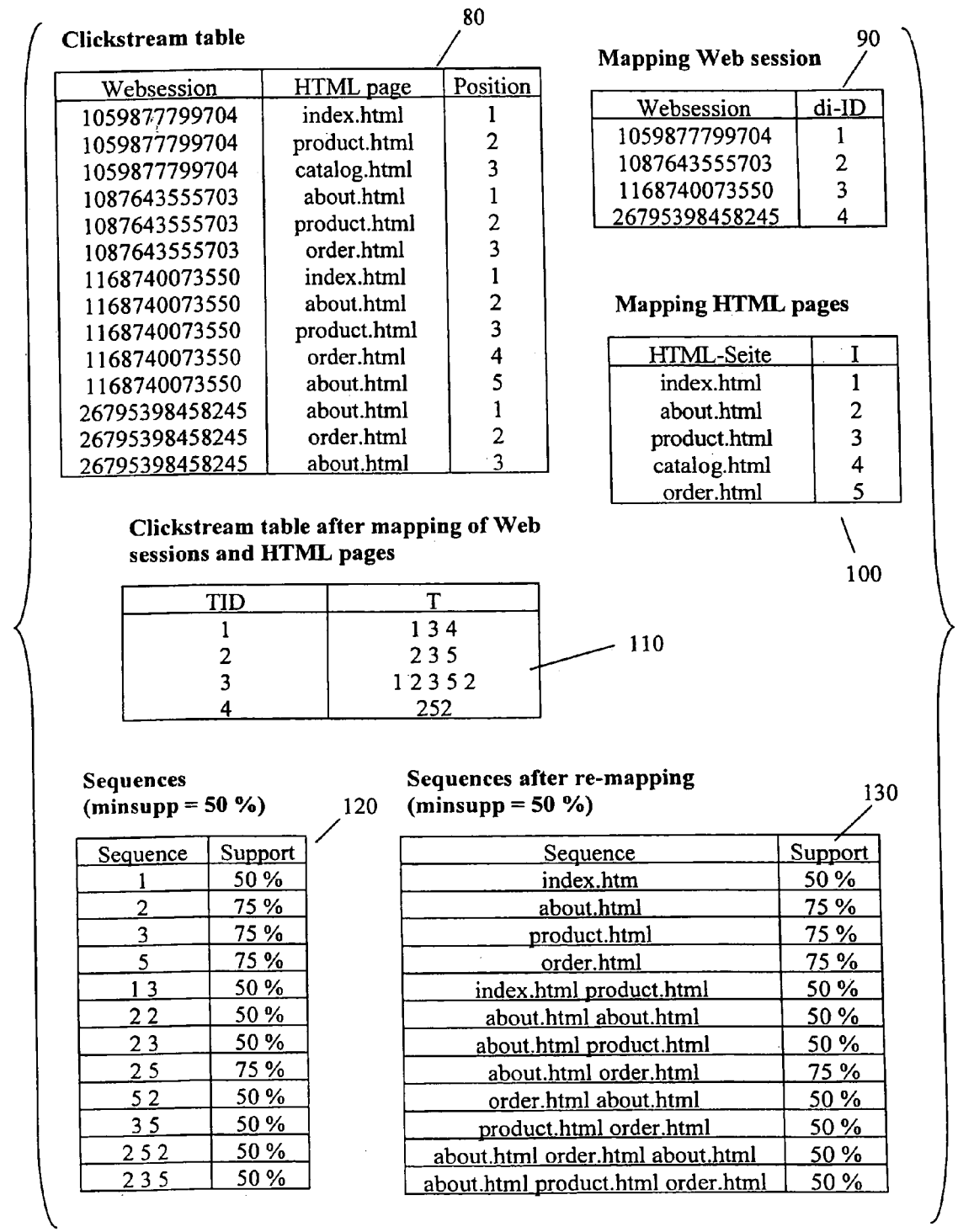
FIG. 1 is a diagrammatic presentation to explain a sequential analysis method according to the invention in connection with a clickstream analysis.

A method of and an apparatus for determining a set of large sequences from an electronic data base will be described below with reference to FIGS. 1 to 4.

First of all, the problem to be solved by sequential analysis will be explained in detail. Let it be assumed that $E=\{e1, e2, \ldots, em\}$, a record of literal constants, referred to as items. A sequence $<s_0, s_1, \ldots, s_k>$ be an ordered list of items. $D=\{d1, d2, \ldots, dn\}$, a record of transactions, each transaction di ($1 \leq i \leq n$) a sequence of items from E so that: $di \subseteq E$. An unambiguous identifier, designated "di-ID", is associated with each transaction.

The sequence $<a0, a1, \ldots, ak>$ is included (partial sequence) in another sequence $<b0, b1, \ldots b1>$ when natural non-negative numbers $i_1 < i_2 < \ldots < i_k$ exist so that: $a1 = bi_1; a2 = bi_2; \ldots; ak = bi_k$.

It is defined that a sequence A possesses a support s % on the set of transactions D if it is contained in s % of all transactions of set D. A sequence is said to be large if its support is not smaller than a given minimum value. A sequence having a length k is called k-sequence. The set of all k-sequences will be referred to below as is Lk. The set of all k-sequences which potentially may be large is called Ck.

Set E can be mapped unambiguously on a subset of natural numbers, i.e. an unambiguous natural identifier may be assigned to each item from E.

Using the designations introduced above, the object to be met may be defined as follows: Based on the given sets E and D, all sequences are to be found whose support value is greater than or equal to a given minimum value, i.e. the following set is looked for:

$$L = \bigcup_k L_k.$$

A known solution trial to resolve the above problem resides in listing all the possible sequences of items of set E and counting the transactions containing them. The number of all possible sequences of set E having a length of from 1 to k is found. The power of set E is m. The number of sequences of length 1 equals the number of items of set E, in other words m. The number of all possible sequences of length i of m items is $m^i$. Then the number of all sequences N equals the sum of the geometric progression to the basis m:

$$N = \sum_{i=1}^{k} m^i = \frac{m^{k+1} - m}{m - 1}.$$

For just m=100 and k=10 already we get $$N = \frac{100^{11} - 100}{100 - 1} \approx 10^{20}$$

different sequences. It is obvious that such a solution trial is inacceptable. For real data, distinctly less sequences are contained in all transactions of set D.

It is much more logical and quicker to test all the sequences which are included in each transaction and to define the support value for each of them. Assuming the length of transaction d0 to be m, this would mean that the transaction d0 includes the number of all sequences of length i which equals the set of i combinations of the items above m. Then the total number of sequences N contained in a transaction of length m is:

$$N = \sum_{i=1}^{m} \frac{m!}{i! \cdot (m-i)!} = 2^m - 1$$

A transaction of length 10 encompasses 1023 sequences, a transaction of length 20 encompasses 1048575 sequences of lengths from 1 to 10 and, accordingly, 20. In spite of the fact that the numbers mentioned describe the most unfavorable case, the number of possible sequences contained in a transaction may become very large.

Each of those sequences must be tested for its minimum support condition, in other words the sum of transactions including them must be formed. It is evident that this process takes a lot of time, too. For this reason, the methods according to the invention described here make use of a solution trial for which no superfluous tests are needed.

Two variants of extracting large sequences will be described below. Both utilize a common record of basic concepts, but they differ in the summing of the support values of the sequences.

The methods belong to the category of iterative procedures. In each step of the procedures all large sequences of a given length are defined. Operation of the procedure is continued until all large sequences of maximum length have been found, in other words until no further large sequences are discovered in the current operating step. Another criterion for terminating the procedure may be the reaching of a maximum length of the sequences which were predetermined by the user.

With both variants of the method according to the invention the large sequences of length k are used for constructing the set of new potential large sequences of length k+1. A sequence is called a candidate if it was generated from large sequences of a length reduced by 1 and if, possibly, it likewise is a large sequence. In this manner the set of candidates having length k presents the set Ck. Obviously, the following is true: $Ck \supseteq Lk$.

1. Method of Generating the Candidate Set.

In both methods, the same principle of generating candidates is applied. The principle differs slightly from the one of generating candidates in the preceding IBM solution trial. The function for generating the candidates uses all large k-sequences—Lk as the input set. The result it offers is a super set of the sets of all large (k+1) sequences—Ck+1. The method of generating the candidate set may be written as stated below, making use of an SQL-like syntax:
INSERT INTO Ck
SELECT p.item$_1$,p.item$_2$, . . . ,p.item$_k$,q.item$_k$
FROM p,q
WHERE   p.item$_2$=q.item$_1$,   p.item$_3$=q.item$_2$,   . . .   p.item$_k$=q.item$_{k-1}$.

The mode of generating the candidates may be illustrated as follows.

Assuming the large sequences of length 4 listed below were found in a step of the procedure:
1. 1 3 2 6
2. 1 4 1 2
3. 2 1 3 2
4. 2 2 2 2
5. 3 1 2 1
6. 3 2 6 2
7. 4 1 2 1.

Checking all possible pairs of large 4-sequences, beginning with the first one and including also all those consisting of the same sequence, the following candidate set is obtained:
1 3 2 6 2—result of the union of 1 and 6
1 4 1 2 1—result of the union of 2 and 7
2 1 3 2 6—result of the union of 3 and 1
2 2 2 2 2—result of the union of 4 and 4

Sequences 5., 6., and 7. did not provide a single pair in which they would have been the first of the "parents". Sequence 5. did not take part in the generation of candidates at all. Sequence 4. formed a union with itself.

The result of the procedure of this method may bring forth a situation where not a single candidate sequence is generated by this method. This means that it is impossible to find but a single sequence of the next level, the k+1 level. Consequently, the method ends with this step.

In the example described above, all possible pairs of large sequences of the previous level were drawn upon for constructing the candidate set. When the method works on real data, there is great likelihood of finding, in a particular step, a set of all large sequences which may consist of thousands or tenthousands of sequences. The process of completely reviewing all pairs possesses a square complexity. On real data, therefore, millions or hundreds of millions of operations would have to be carried out to compare sequences. The process of generating candidates thus might involve some serious time expenditure.

For this reason, a data structure was elaborated which permits to reduce the complexity of reviewing the pairs of large sequences. According to this concept, the first and the last large (k+1) sequence must be stored for each large k-sequence, beginning with the k-sequence under review. Of course, that requires sorting of the record of k-sequences from the small k-sequences to the large sequences. The k-sequence A is defined as being smaller than the k-sequence B if the first different item is smaller in sequence A than in sequence B.

Thus, we possess in a step of the method Lk—the set of the large k-sequences of the preceding step, Ck+1—the set of the candidates. For each k-sequence from Lk, moreover, the number of the second "parent" which generated this sequence is memorized. Based on this number, the spectrum of sequences from Lk with which each k-sequence may be united can be defined for each k-sequence. This data structure is employed in both variants of the method specified. A dynamic array having the dimension |Lk−1|×2 is used for memorizing the numbers required for the sequences from Lk−1.

In the $k^{th}$ step, the set of large sequences Lk is available with each of which the number of the sequence from Lk−1 is connected that forms the second "parent". As a result of the work the set Lk+1 is obtained from Ck+1 in the $k^{th}$ step, and for the sequences of this set the second parent's numbers are memorized, and a new structure is formed of the numbers of the sequences from Lk.

In the example described above, the sequence <2 1 3 2> was formed in the preceding step from the sequences <2 1 3> and <1 3 2>. Assuming sequence <1 3 2> had had its place at number 3. of the list of sequences L3, then the numbers 1 and 1 must be memorized in the structure described for the sequence of number 3. - in accordance with the first and last sequences of L4 which begin by <1 3 2>. If the new sequence <2 1 3 2 6> proved to be large the number of its second parent is memorized—1, for sequence <2 1 3 2> it is number 3—the number of the first newly obtained 5-sequence.

If a descendant does not exist for a sequence from Lk−1 this fact is memorized in the structure of the numbers by way of an invalid number—for example 1.

2. The First Variant

The process of operation of the first method may be subdivided into a plurality of stages:
(i) search for all large 1-sequences—the various items of E—L1.
(ii) search for all large 2-sequences—L2 on the basis of L1. For each large sequence found, the list of transaction numbers containing the same is memorized at the same time.
(iii) search for the large k-sequences on the basis of Lk−1. The third stage is repeated until Lk=∅ has been obtained.

Figure 3:
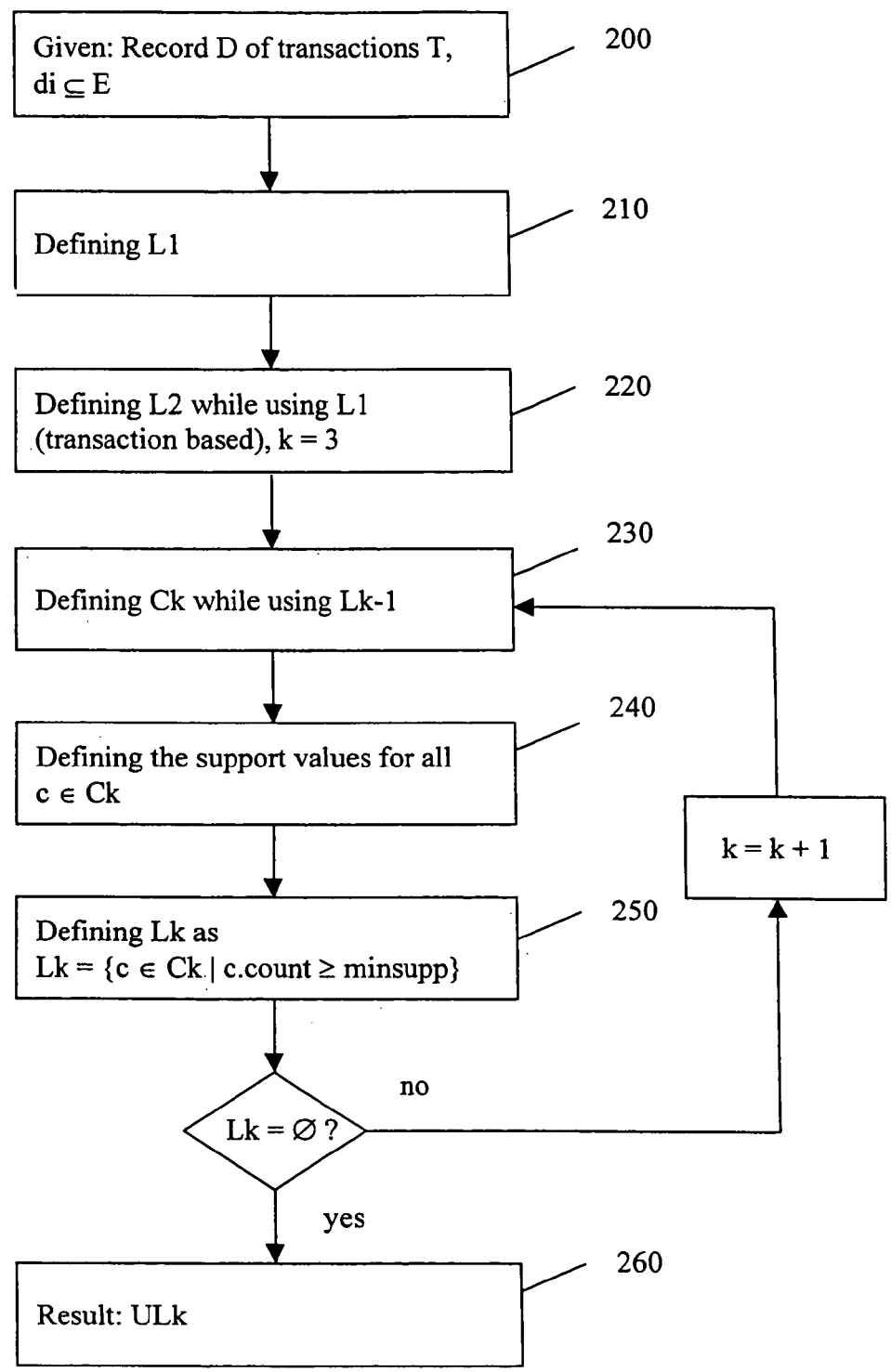
FIG. 3 is a flowchart of an embodiment of a sequential analysis method according to the invention in accordance with a first variant.

The first variant for which a flowchart is shown diagrammatically in FIG. 3 may be represented as follows in pseudo code:

```
L1 = {large 1-sequences};
C2 = candidate-gen(L1);              // 2 candidates
forall transactions t ∈ D do begin
    Ct = subset(C2,t);               // candidates contained in t
    forall candidates c ∈ Ct do
        c.count++;
end
L2 = {c ∈ C2| c.count ≧ minsupp};
for (k=3; Lk−1 ≠ ∅; k++) do begin
    Ck = candidate-gen(Lk−1);
    forall candidates c ∈ Ck do begin
        Tc = subset(c,D);            // transactions including c
        c.support = |Tc|;
    end
    Lk = {c ∈ Ck | c.count ≧ minsupp};
end
answer = ∪Lk;
```

In the first variant of the method, two solution trials are combined for counting the support values of the candidate sequences. Sequential transit through the set of input transactions is the method employed to find set L2. For each transaction, the candidates contained in it are defined, and for each candidate the counter of the support value is incremented by one.

In the first variant of the method the same solution trial was selected for this stage and for the next one: for each candidate, the list of transactions is determined which might contain the candidate. The list of transactions results as the cut set across the memorized transaction lists of the parents of the candidate under investigation. Evidently, the candidate sequence can be included only in those transactions in which both parents of the particular candidate are memorized. The list of transactions of the candidate includes the numbers of the transactions and, making use of the cut set formation, only those numbers are added which are included in the lists of transactions of both its parents. The list thus obtained permits the number of transactions which must be tested for the presence of a certain candidate to be reduced substantially, especially so in the final steps of the procedure.

However, transit through the whole set of candidates is a precondition for the statement of the transaction lists. In the second stage of the method, when counting set L2, nothing but the items of set L1 are known. Any pair of large 1-sequences forms a candidate of length 2. During operation of the method with real data, the power of set L1 may reach several tens of thousands of 1-sequences. The number of candidates of length 2 then will be a few hundred million. A complete review of all the possible candidates would require an unreasonable amount of time. In this case it makes sense to select the principle which was used fully in the second variant of the method.

According to the basic idea of the second variant of the method, a counter of the support value is introduced for each candidate. That is followed by the sequential transit through the entry set of the transactions. For each transaction, the candidates it includes are defined, and their counters of the supports are incremented by one. In the second variant of the method, a more complex scheme is used for defining the candidates which are contained in a particular transaction, but a simpler method may be resorted to for defining set L2. Two transits through the transactions, one embedded in the other, are required for defining the numbers of all candidates. In the outer cycle, the large items contained in the transaction are selected one after the other. The inner cycle begins with the item which succeeds the item chosen in the outer cycle. Each selected pair of large items of set E represents a length-2 candidate and, therefore, the corresponding counter of the support value of the candidate must be incremented. The number of the counter is calculated starting from the indices of the selected items in the list of large items and the total number of large items found. Let a and b—the respective selected first and second items of a candidate and N—be the number of 1-sequences found in the preceding stage of the method—the large items from L1. Then the number of the respective candidate is obtained according to the following formula: $n_c = Na + b$ If the repeated incrementing of the counter of the support of a specific candidate is to be excluded, in dealing with one and the same transaction, a means of marking the fact that incrementation of the counter took place in a particular transaction must be provided. The simplest way of doing that is to store, for each candidate, not only its counter of the support but, in addition, also the number of the last transaction which caused the counter of the candidate of interest to be incremented. In view of the fact that the transactions from the entry set are dealt with successively, the content of the field of the number of the last transaction gives an indication whether the counter was incremented since the beginning of dealing with the concrete transaction under review.

The manner of proceeding as described above for determining the 2-sequences L2 has the advantage that the calculations involved are relatively simple because only those candidates are processed which indeed are contained in the transactions input. Yet this method also suffers from a serious disadvantage. For each candidate, two values related to it must be stored: the counter of the support value and the number of the last transaction which incremented the counter. Using a 32 bit word for each field which, theoretically, would allow processing a maximum of 2147483647 transactions, requires 8 bytes per candidate. At the stage of defining set L2 there may be hundreds of millions of different candidates. This stage in the operation of the method consequently requires some hundred million bytes of RAMs and that, indeed, presents a serious limitation. It is the square-law dependence of the memory needed on the number of large 1-sequences found in the preceding stage that causes this serious limitation.

To overcome this limitation, a scheme of multiple transit of the processing of the transaction set in the course of constructing set L2 was realized in the final version of the first method. During a full transit through the input set of transactions, only those pairs are dealt with whose first item lies within a certain range of values. In this manner the storage space required for the second stage of the procedure can be restricted, in consideration of the storing capacity available in the computer. Of course, greater memory restrictions in turn will demand more transits and, accordingly, the procedure will become slower in the second stage. The method described of defining the 2-sequences L2, therefore, is a compromise between the necessary storage space and the processing speed. This fact is confirmed by the experimental execution time behavior of the method.

2.1 Further Implementation Details of the First Variant

In the first stage of operation of the method all items of set E must be found that occur in the input transactions no less than a predetermined number of times. As the numbers and frequencies of the various items from E are not known initially a method must be provided of storing both the actual item and the number of transactions in which it is contained. When practicing both variants of the method, a transit through all the input transactions takes place. A standard class (e.g. from Java)—the hash table, is drawn upon for storing the items and their counters. This class permits storing of the pair <key, value>, and for quick search of the values it uses the mechanism of the hash table in respect of the key values. In implementing the method, the key chosen is an object of the integer class (wrapper class for integral values) (e.g. from Java) which is initiated with the value of the selected item, and the value chosen is another object of the integer class which is initiated with the value of its counter. When selecting another item of a transaction, access is taken to the object of the hash table class to obtain the value through the key which is identical with the selected item. If such a value was found in the hash table, another rewrite, incremented by one, is caused. If no such value was found for the key, the pair to be registered in the hash table will be the pair of which the value it contains is the initial value of the counter, in consideration of the item already selected—1.

Repeated incrementing of the counter of a transaction is avoided, in implementing the method, by choosing a different class (e.g. from Java)—vector, in which all those items are stored that were already processed by a transaction. Before searching for the value in the hash table, the method attempts to find the item in the instance of the vector class. If such an item was found, it means that it was processed before in this transaction, and the method will proceed to the next item of the transaction. Of course, the vector of values is purged when the method proceeds to the next transaction. Having gone through the transaction set, only those items are selected whose counter values are not smaller than the minimum value. The large items found are stored in the array and sorted so that, in the further course of proceedings, binary search can be applied to the items and be mapped to the set of integral positive numbers 0, . . . , N−1, with N being the number of large items found. The large items are used to form set L1 of the large 1-sequences.

In implementing the method, the TransactionList class is used for storing the list of the numbers of the transactions. It permits storing the numbers of the transactions in an array, adding a number to the end of the list, provided the numbers are added in rising order. This is an indispensable condition for the correct operation of the method of the Transaction-List class which forms the cut set of both transaction lists. The initial lists of the transactions are formed in the course of the sequential transit through the set of input transaction during the stage of the construction of L2, at the same time, establishing, in a natural way, the conditions of the sorting order. Further, the new lists are created while the cut set operation is executed. The lists of the numbers are stored in an array. However, since the length of the array is defined during the stage of dynamic storage allocation, additional fields of the array must be made available, as required, by increasing the length. An array having an initial size is made up and gradually filled during the generation of an instance of the TransactionList class. When the maximum of numbers is reached, the memory is made available once more. The maximum storage capacity of the array is increased ten-fold, for instance, a new array having the same maximum length is made available and the contents of the previous array are copied into the same. The old array may be marked as superfluous (e.g. for the virtual machine in Java).

During the third stage of operation of the method, all the large k-sequences memorized during the preceding step are reviewed. The numbers of the first and last large k-sequences, with which the sequence found can be united, are found by way of the stored number of the second parent of the sequence, making use of the data structure described above. Moreover, the intersection forming operation is carried out across the lists of transactions of both sequences. If the length of the resulting list is smaller than the required minimum support value the candidate under review is discarded immediately even without an operation of a direct candidate and counting of the number of transactions containing the same. Otherwise, the sequence of the items of the candidate itself is generated and each transaction of the list obtained from the formation of the intersection is checked as to the content of candidate sequences it includes. If a corresponding sequence was found in a transaction the number of the transaction is memorized. In this manner, at the end of processing a candidate, there will be a list of transactions which include the candidate. This candidate will be stored together with the number of its second parent if the number of such transactions is not smaller than the minimum number.

The actions described above are repeated for each candidate. If, ultimately, not a single large sequence was found the operation of the third stage of the method is terminated and the results are output via the interface. There may be two reasons why not a single sequence was found in the course of one step. In set Lk, there may not be a sequence which might form a candidate together with another sequence, i.e. not a single candidate exists in a step. Another reason may be the variant where, ultimately, not a single candidate presents a large sequence.

Summarizing, the first variant of the method proves to be quick on large amounts of data, and its storage space requirement is small. As far as storage space and computing time regarding the use of transaction lists are concerned, empirical calculations and experimental results show that, based on real data, they tend to be greatly reduced because, as the sequences being processed become longer they will be contained in a progressively smaller number of transactions, as a result of which not only the lists become shorter but also the amount of time needed to process them. Consequently, it is a requirement for operation of the first variant of the method that the initial set of transactions be entered in the form of a list of sequences of integral numbers, the minimum support value be input as a floating value, and the storage space available for the second stage of the method be input, too.

3. Second Variant

Figure 4:
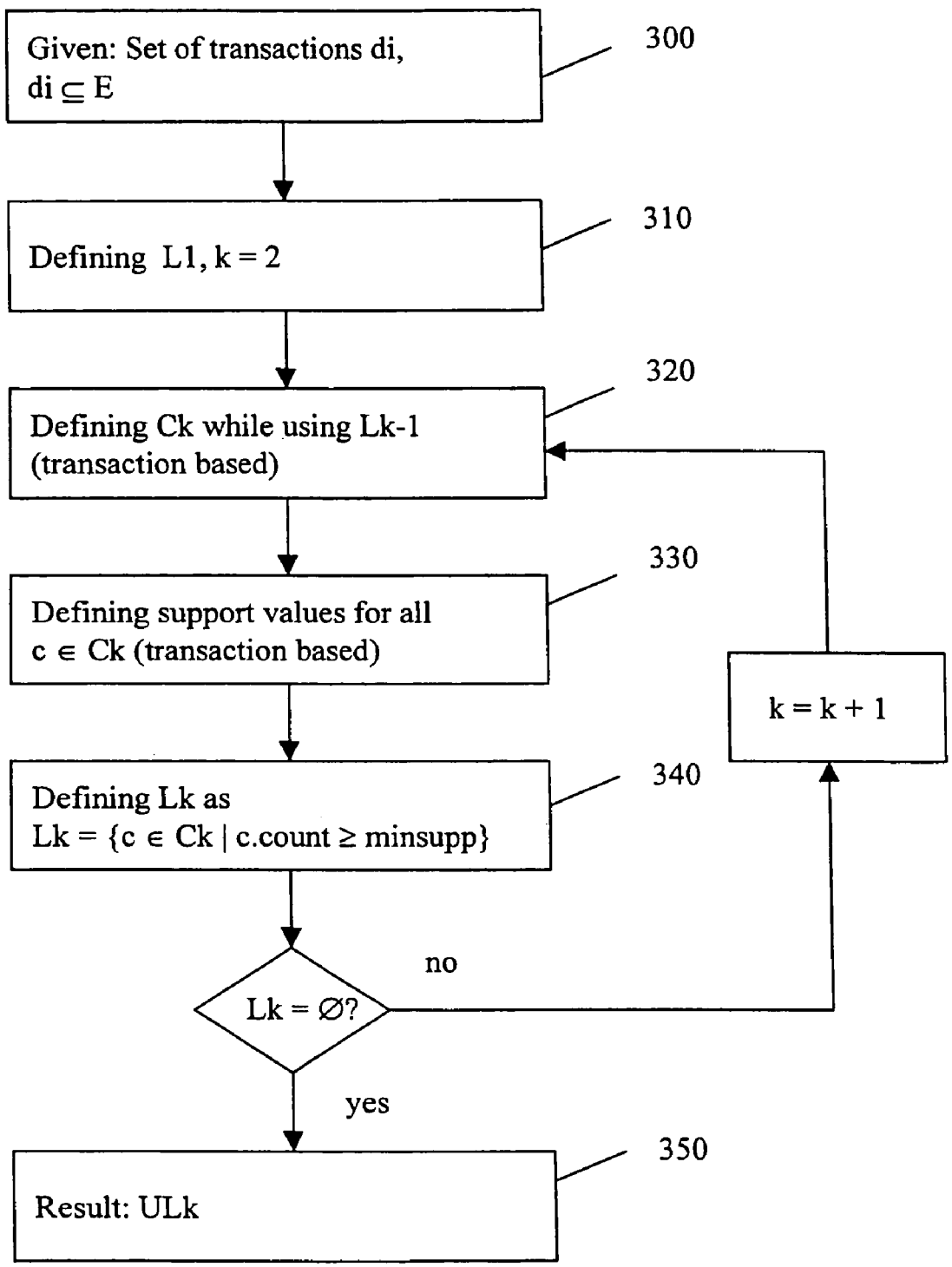
FIG. 4 is a flowchart of an embodiment of a sequential analysis method according to the invention in accordance with a second variant.

The second variant of the method, of which a flowchart is illustrated diagrammatically in FIG. 4, was elaborated and implemented for purposes of comparison with the first variant of the method as regards speed and storage space. The second variant can be represented as follows in pseudo code:

```
L1 = {large 1-sequences};
for (k=2; Lk−2 ≠ Ø; k++) do begin
    Ck = candidate-gen(Lk−1);   // new candidates
    forall transactions t ∈ D do begin
        Ct = subset(Ck, t);
        forall candidates c ∈ Ct do
            c.count++;
    end
    Lk = {c ∈ Ck | c.count ≧ minsup}
end
answer = U Lk;
```

The method illustrated is very general and does not implement the process of selecting the candidates that are included in a particular transaction. In the simplest case this may be reviewing all candidates with the aim of selecting those which are contained in the sequence of the transaction. Another variant provides for reviewing all sequences of a given length and selecting those from among them which represent candidates. It is evident that both methods are disadvantageous for being inefficient. Therefore, a different method is described for implementing the second variant.

The second variant makes use of quite a few of the same ideas as the first one. In particular, the same principle is applied without much alteration for calculating set L1. The entire description given above of the first stage of operation of the first variant of the method applies to the second variant as well. As already mentioned, for adding the support of the candidates, the second variant of the method makes use of the concept which, in the first variant, was applied only in the second stage for generating the set of large 2-sequences, L2.

3.1 Further Implementation Details of the Second Variant

A specific data structure is used with the second variant of the method so as to have the possibility of defining the list of candidates included in it, for every transaction. From the second stage of the method on, each transaction is presented as a list of the numbers of the k-sequences found in the preceding step of the method. Reviewing the pairs of these k-sequences and uniting them according to the method described above of generating candidates, all the candidates of length k+1 can be obtained that are included in a particular transaction. Yet the list of the large k-sequences is organized as a two-dimensional array of values so as to separate the candidates. The resulting data structure will be illustrated in the example below.

Let us assume the entry set of transactions includes the following transaction:
<3 1 3 2 1>.

Furthermore, let it be assumed that in the second stage of operation of the method it was discovered that the sequences <3 1>, <3 2>, <1 2>, and <1 1> contained in that transaction are large, having numbers 5, 7, 3, and 1, respectively. In the second stage of operation of the method the following data structure was generated, which corresponds to the given transaction:

1. 5 7
2. 3 1
3. 7 5
4. -

The number of lines of this structure equals the number of items in the transaction during the stage of construction of set L2. In the further stages this set equals the number of lines in the preceding structure for this transaction. Each line contains the numbers of the large sequences which begin with this item or with this line in the structure that was generated in the preceding step. In each step, the pairs of numbers of the large sequences of the previous level are reviewed, and the method searches all pairs of numbers which might be united. The test for possible union is carried out on the basis of the same principle as with the first variant of the method.

A structure of this kind is formed for each transaction and is updated in each step of the method. The first structure is generated in the second stage of the method, and that is the only difference compared to the corresponding stage of the first variant of the method. In one step of the method, all transactions of the entry set are processed successively, utilizing the structure just described. Step by step each item of each line is selected, and following that the items of each subsequent line are searched. If the pair thus selected may become a candidate the counter of its support is incremented by one. To avoid multiple incrementing of the counter during the processing of a transaction, the idea of the first variant of the method may be resorted to in that the number of the last transaction incremented is stored for each candidate.

This illustrates that actually it is not necessary, with the second variant of the method, to generate candidate sequences during the execution time because, contrary to the first method, that is not needed for adding up the support values. The large k-sequences found during the $k^{th}$ step are stored in the form of the pairs of their parents. That helps save storage space because in practice the large k-sequences may come about at the end of the operation proper of the method during the transit from set L1 to set L2 so that they will not unnecessarily occupy storage space while the main cycle of the method is underway.

The process of filling the required structure may turn out to be difficult because, while the numbers of the candidates are known during the processing of the transaction, those of the large sequences are not as they are defined only after all transactions have been processed. During the processing, therefore, the numbers of the candidates contained in them are entered into the renewed structure. When all transactions of the entry set have been processed the numbers included in the structure must be corrected to allow for the candidates which did not fulfill the support condition. The part of the method during which the numbers are corrected may be presented as follows:

```
m = 0;        // accumulator of the correction
forall c∈ Ck do begin      // for each candidate
    if c.count>=minsup then c.correction = −m−1
    else m++;
end
```

Having accomplished this fragment of the method, the value of the correction is known for each candidate and must be deducted from the number of the candidate so as to provide the number of the large sequence. In fact, to get the number of the sequence from the number of the candidate the number of candidates that did not make the test must be deducted whose numbers are smaller than the number of the candidate in question. The final stage of the renewal of the structure of the transactions is the transformation of the numbers of the candidates into the numbers of the large sequences simultaneously with the removal of the numbers of the non-large candidates and the sorting.

The sorting serves to expedite the search for paired sequences during the processing of the transaction structures, in other words those sequences with which the selected sequence may be united.

Without sorting of the lines of the structure of the transactions the search for the second parent would involve a full transit of the subsequent lines, including a test of the condition for union. Sorting the values of the numbers of the large sequences introduces a rising order, thus providing the opportunity of most rapidly finding a value in the line, by binary search, starting with which the numbers of the parent sequences are memorized. Moreover, an orderly transit through the line is carried on until a number of a sequence is larger than the maximum parent number for the selected first parent. Experimental data have demonstrated that the sorting introduced, which is not absolutely required for the operation of the method, accelerates operations in those cases in which the structure related to a particular transaction contains some very long successive lines. With the first variant, without sorting, a clear drop in efficiency could be observed in some parts of the transaction set, which is why the overall time of the operation of the method is much prolonged. Having applied the sorting, the method operated many times faster on such data, depending on the particular entry transaction sets.

During the processing of the transaction structures, the numbers of the large sequences found in the preceding step of the method and included in the transaction currently being processed are selected successively. For each number selected it becomes a task to define the numbers of the first and last parent with which the sequence having the selected number may be united. Besides, the number must be known for every candidate in order to be able to increment the counter. This problem is solved partly as was done with the first variant of the method. Yet the implementation of the second variant makes use of a slightly modified idea in consideration of the requirement that the number of the candidate must be known. In the case of the first variant, the number of the candidate is known because, for all practical purposes, in the main cycle a transit through the candidate set takes place and a specific structure is renewed in each step for quickly determining the first and last numbers of possible parents. With the second variant, a modified structure is applied in consideration of the need for storing the numbers of the corresponding candidates. In each entry of this structure, not only the numbers of possible parents are stored but also the number of the first candidate that can be generated. Via the number of the second parent of a large sequence, thus the numbers of the parents can be determined with whom the sequence under review may be united, and also the numbers of the corresponding candidates.

With the second variant of the method as, by the way, also with the second stage of the first method, storage space must be allocated to the values of the counter of the support and the array of the numbers of the transaction which was the last to increment the counter.

4. Description of a Program Interface

The program interface is considered in the form of an example of applying the method in a Java program.

The TransactionSetSeq class is used for storing the record of the sequential entry transformations. An instance of the class is realized by the following instruction:
TransactionSetSeq tss=new TransactionSetSeq( );

Now we add all transactions of the entry record:
for (int i=0;i<<number of transactions>;i++) {

Each sequential transaction is represented as an instance of the ItemSetSeq class:
ItemSetSeq iss=new ItemSetSeq( );

The items of the transactions are integral numbers—the following method of the ItemSetSeq class serves to add a new item to the transaction:
void addItem(int item);

We add all the items of the current transaction:

```
for (int j=0;j< < number of items of the current transaction>;
j++)
    iss.addItem(<number of the item >);
```

The following method of the TransactionSetSeq class is used for adding a transaction to the transaction record:

```
void addTransaction(ItemSetSeq iss);
tss.addTransaction(iss);
}
```

An instance of the Sequential or Sequential2 class must be generated for calculating the sequences:
Sequential seq=new Sequential( );
Sequential2 seq2=new Sequential2( );

The following method contained in the Sequential and Sequential2 classes must be called to start the method:
  SequentialResult SequentialAlg(TransactionSetSeq tss, double minsupp);
where
  tss—entry set of the transactions,
  minsupp—minimum support value.
SequentialResult    seqResult=seq.SequentialAlg(tss,minsupp);
  or
SeguentialResult    seqResult=seq2.SequentialAlg(tss,minsupp);

The result of operation of the method is stored in the object of the SequentialResult class. The SequentialResult class contains the following method for accessing the sequences found:

ItemSetSeqList getLargeSequences( );
ItemSetSeqList issList=seqResult.getLargeSequences( );
  The ItemSetSeqList class contains the methods:
  int getSize( );—supplying the number of sequences,
  ItemSetSeq getItemSetAt(int index);—supplying the sequence of the number index.
for (int i=0;i<issList.getSize( ); i++) {
  ItemSetSeq iss=issList.getItemSetAt(i);
  The ItemSetSeq class contains the following method for accessing the sequence:
  int getItemAt(int index);
  The following method supplies the length of the sequences:

```
int getSize( );
for (int j=0;j<iss.getSize( );j++)
    int item = iss.getItemAt(j);
}
```

The following method of the ItemSetSeq class supplies the value of the counter for the support:
  int getSupportCount( );
  The actual support value support for each sequence is the quotient of the value of the support counter and of the number of all transactions.

5. Example: Clickstream Analysis

Figure 2:
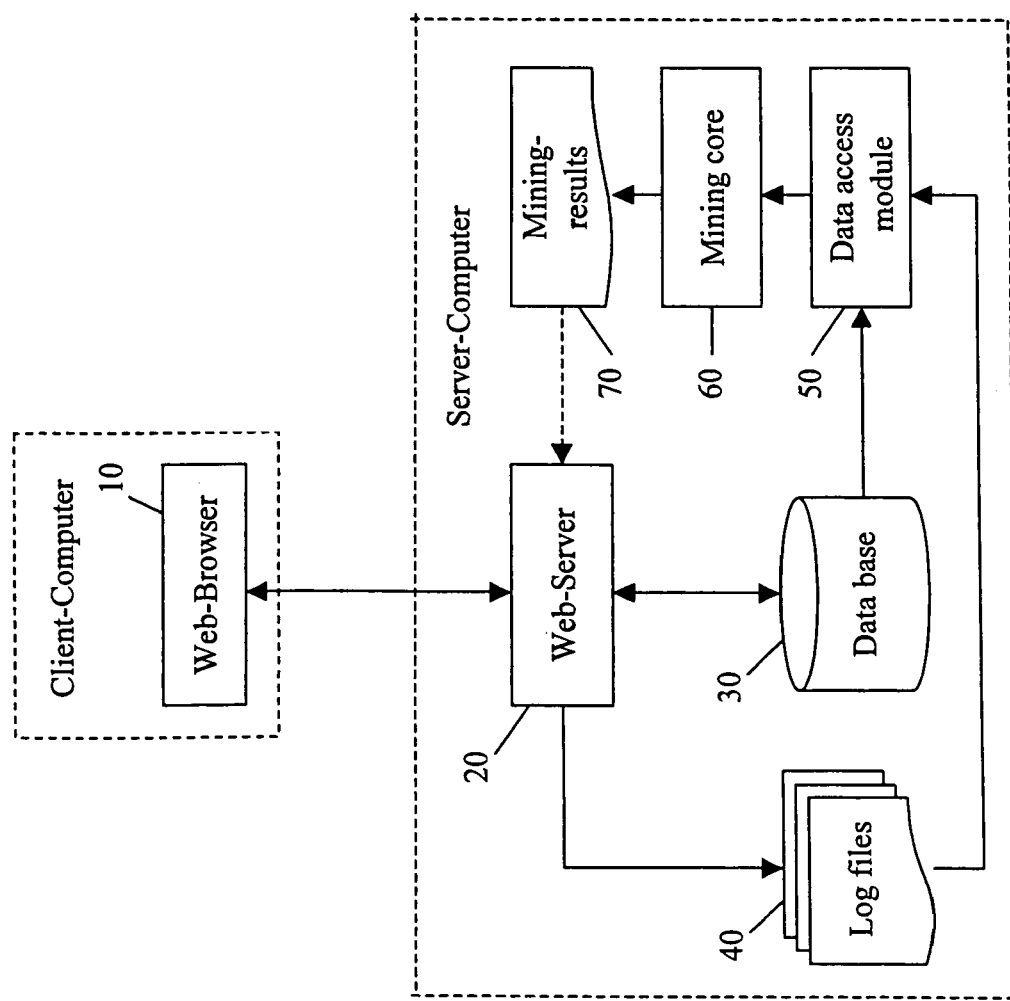
FIG. 2 is a diagrammatic presentation of an arrangement for carrying out a sequential analysis method according to the invention.

Referring to FIGS. 1 and 2, the application of the method described above will now be explained by way of example with reference to a clickstream analysis of Web servers.

The user needs a Web browser 10 to call a Web site via the internet, for example the Netscape Navigator, by which he connects to a Web server 20, for example the Apache Web server. Information about HTML pages of a Web site that were fetched is stored by Web servers in data bases 30 or log files 40. The information concerning those HTML pages is stored in a table. The columns correspond to the information about the page that was fetched, e.g. date and time, URL of the HTML page fetched, referer URL, type of Web browser. The lines correspond to the fetched HTML pages themselves. Various mechanisms, not described in any greater detail here, make it possible to identify Web sessions and allocate them to each fetched page. A Web session is a sequence of HTML pages which a user has fetched successively from the Web site.

It is the aim of the clickstream analysis to find out typical paths along which users of a Web site mainly move. For instance, it may happen with an E-commerce shop that many users enter the shop through the main page, go into a certain product category, look at a certain product in a detail view, and thereafter leave the shop. The conclusion may be drawn that the product looked at did not satisfy the demand, and that consequently its presentation absolutely needs to be improved. Where users choose cyclical paths, often the conclusion may be drawn that for them the shop is not structured clearly, and so on. Now, having provided a data access module 50, a data mining application 60 implemented via a program and performing the actual clickstream analysis takes access to the data of the HTML pages fetched and to be found either in the data base 30 or in the log files 40. The data access module 50 executes various transformations, like the resolution of IP addresses, recognition of date formats, and the extraction described above of Web sessions.

The mining application 60 calculates the most frequent paths followed by users through the Web site. Finding the typical paths in Web sites is a task for sequential analysis. In this case E={e1, e2, ..., em} is the set of all HTML pages of a Web site. Each transaction di corresponds to a Web session, the items of which form a sequence <s0, s1, ..., sk> of HTML pages. The total number of transactions D corresponds to the total of Web sessions of the Web server. The clickstream transactions for a simple example are shown at 80 (after mappings 90 and 100 into the range of integers) and 110, respectively. It is the task of the clickstream analysis to find all the large sequences of HTML pages which provide the mining results 70, with a given minimum support parameter s. In the example of the clickstream table 80, the large sequences found are shown at 120 or 130, respectively, (after re-mapping) for a minimum support value of 50%. These are the typical users paths of the Web site whose analysis, as explained above, may be used for improving the structure of the Web site. In particular, the results may be incorporated directly in the Web server, for instance, by way of recommended HTML pages (recommender systems).

The method described of the invention is very well suited for calculating large sequences, especially so because it can analyze large amounts of data. Log file tables of popular Web sites, in particular, often comprise millions of HTML pages fetched and, therefore, are extremely demanding as regards sequential analysis methods. Consequently, evaluating this information by means of sequential analysis usually was very intensive in terms of computer time and thus limited to special cases (sequences of length 2, only a few Web sessions, etc.). These restrictions are overcome by the method described here for almost any clickstream data occurring on present day Web servers.

The features of the invention disclosed in the specification above, in the claims and drawing may be essential to im-plementing the invention in its various embodiments, both individually and in any combination.

What is claimed is:

1. A computer implemented method of determining a set of large sequences from an electronic data base comprising a set D={d1, ..., dn} of transactions di ($1 \leq i \leq n$) in a computer system with an implemented query module, each of the large sequences on the set D of transactions di having a support value greater than or equal to a given support value S, each of the transactions di of the set D being a sequence of items of a record E={e1, ..., em} of items ej ($1 \leq j \leq m$) and the method comprising the following steps:
   a) determining, via a computer a set L1 of large sequences from the set D of transactions, the large sequences of set L1 each comprising exactly one item of the record E, and an assigned support value $S_{L1}$ on the sequence D of transactions each being greater than or equal to the given support value S;
   b) determining, via a computer a set L2 of large sequences from the set D of transactions, the large sequences of set L2 each comprising exactly two items of the record E in a respective order $R_{L2}$, and an assigned support value $S_{L2}$ on the set D of transactions each being greater than or equal to the given support value S, and nothing but sequences comprising one of the large sequences of set L1, as a partial sequence, being taken into account in determining set L2;
   c) determining, via a computer a set Lk (k>2) of large sequences from the set D of transactions, the large sequences of set Lk each comprising exactly k items of record E in a respective order $R_{LK}$, and an assigned support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$, being taken into account in determining set Lk;
   d) repeating step c) for k=k+1 and terminating the repetition of step c) when a predefined termination condition is fulfilled; and
   e) when the repetition of step c) is terminated, outputting via a computer an indication of whether any sequence results exsist.

2. The computer-implemented method as claimed in claim 1, wherein the set D of transactions is searched for candidate sequences which comprise two of the large sequences of set L1 or set Lk−1, respectively, as partly overlapping partial sequences, in determining set L2 in step b) and set Lk in step c), respectively, and wherein an assigned support value counter is registered for each candidate sequence found for the first time, and the assigned support value counter is incremented when the respective candidate sequence is determined again in searching the set D of transactions.

3. The computer-implemented method as claimed in claim 2, wherein a display value is generated and updated for each assigned support value counter to indicate the transaction for which the assigned support value counter was last incremented.

4. The computer-implemented method as claimed in claim 3, wherein only those sequences of the candidate set of sequences corresponding to all combinations in pairs of the sequences of set L1 are taken into account of which the first item lies within a given range of values.

5. The computer-implemented method as claimed in claim 1, wherein:
   the set D of transactions is searched for candidate sequences comprising one of the large sequences of set L1, as a partial sequence, when determining set L2 in step b), and an assigned support value counter is registered for each candidate sequence found for the first time, and the assigned support value counter is incremented when the respective candidate sequence is determined again in searching the set D of transactions; and
   a candidate set of sequences is formed, when determining set Lk (k>2) in step c), which set comprises all combinations in pairs of the sequences of set Lk−1, and of the set D of transactions those transactions are defined which comprise at least one sequence of the candidate set, and the support value is determined for those sequences of the candidate set for which a transaction was found that comprised this sequence.

6. The method as claimed in claim 5, wherein only those sequences of the candidate set of sequences corresponding to all combinations in pairs of the sequences of set L1 are taken into account of which the first item lies within a given range of values.

7. The computer-implemented method as claimed in claim 5, wherein a display value is generated and updated for each assigned support value counter to indicate the transaction for which the assigned support value counter was last incremented.

8. The computer-implemented method as claimed in claim 1, where the predefined termination condition comprises substantially all large sequences of maximum length being found.

9. The computer-implemented method as claimed in claim 1, where the predefined termination condition comprises reaching a maximum length of the large sequences.

10. A computer program product stored and implemented on a computer to determine a set of large sequences from an electronic data base comprising a set $D=\{d1, \ldots, dn\}$ of transactions di ($1 \leq i \leq n$) in a computer system with an implemented query module, each of the large sequences on the set D of transactions di having a support value greater than or equal to a given support value S, each of the transactions di of the set D being a sequence of items of a record $E=\{e1, \ldots, em\}$ of items ej ($1 \leq j \leq m$) and the product comprising the following means:

a) means recorded on an electronic storage medium for determining a set L1 of large sequences from the set D of transactions, the large sequences of set L1 each comprising exactly one item of the record E, and an assigned support value $S_{L1}$ on the sequence D of transactions each being greater than or equal to the given support value S;

b) means recorded on the electronic storage medium for determining a set L2 of large sequences from the set D of transactions, the large sequences of set L2 each comprising exactly two items of the record E in a respective order $R_{L2}$, and an assigned support value $S_{L2}$ on the set D of transactions each being greater than or equal to the given support value S, and nothing but sequences comprising one of the large sequences of set L1, as a partial sequence, being taken into account in determining set L2;

c) means recorded on the electronic storage medium for determining a set Lk (k>2) of large sequences from the set D of transactions, the large sequences of set Lk each comprising exactly k items of record E in a respective order $R_{LK}$, and an assigned support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$, being taken into account in determining set Lk;

d) means recorded on the electronic storage medium for repeating step c) for k=k+1 and terminating the repetition of step c) when a given termination condition is fulfilled; and e) means recorded on the electronic storage medium for outputting an indication of whether any sequence results exsist, when the repetition of step c) is terminated.

11. The computer program product as claimed in claim 10, where the predefined termination condition comprises substantially all large sequences of maximum length being found.

12. The computer program product as claimed in claim 10, where the predefined termination condition comprises reaching a maximum length of the large sequences.

13. An integrated sequential analysis system, comprising:

an electronic data base comprising a set $D=\{d1, \ldots, dn\}$ of transactions di ($1 \leq i \leq n$), each of the large sequences on the set D of transactions di having a support value greater than or equal to a given support value S, each of the transactions di of the set D being a sequence of items of a record $E=\{e1, \ldots, em\}$ of items ej ($1 \leq j \leq m$);

a query module comprising a query means coupled to the data base and a processing means for detecting query parameters and generating queries to the query means;

means for determining a set L1 of large sequences from the set D of transactions, the large sequences of set L1 each comprising exactly one item of the record E, and an assigned support value $S_{L1}$ on the sequence D of transactions each being greater than or equal to the given support value S;

means for determining a set L2 of large sequences from the set D of transactions, the large sequences of set L2 each comprising exactly two items of the record E in a respective order $R_{L2}$, and an assigned support value $S_{L2}$ on the set D of transactions each being greater than or equal to the given support value S, and nothing but sequences comprising one of the large sequences of set L1, as a partial sequence, being taken into account in determining set L2;

means for determining a set Lk (k>2) of large sequences from the set D of transactions, the large sequences of set Lk each comprising exactly k items of record E in a respective order $R_{LK}$, and an assigned support value $S_{LK}$ on the sequence D of transactions each being greater than or equal to the given support value S, and nothing but sequences comprising two of the large sequences of set Lk−1, as partly overlapping partial sequences, with the respective order $R_{LK-1}$, being taken into account in determining set Lk;

means for repeating step c) for k=k+1 and terminating the repetition of step c) when a given termination condition is fulfilled; and means for outputting an indication of whether any sequence results exsist, and outputting the indication when the repetition of step c) is terminated.

14. The integrated sequential analysis system as claimed in claim 13, where the predefined termination condition comprises substantially all large sequences of maximum length being found.

15. The integrated sequential analysis system as claimed in claim 13, where the predefined termination condition comprises reaching a maximum length of the large sequences.

* * * * *

UNITED STATES PATENT AND TRADEMARK OFFICE
CERTIFICATE OF CORRECTION

| | |
|---|---|
| PATENT NO. | : 7,209,910 B2 |
| APPLICATION NO. | : 10/673040 |
| DATED | : April 24, 2007 |
| INVENTOR(S) | : Thess et al. |

It is certified that error appears in the above-identified patent and that said Letters Patent is hereby corrected as shown below:

Col. 15 line 47, insert a comma --,-- after the phrase "determining, via a computer"

Col. 15 line 53, insert a comma --,-- after the phrase "determining, via a computer"

Col. 15 line 62, insert a comma --,-- after the phrase "determining, via a computer"

Signed and Sealed this

Twenty-sixth Day of June, 2007

JON W. DUDAS
*Director of the United States Patent and Trademark Office*